United States Patent Office 3,464,937
Patented Sept. 2, 1969

3,464,937
POLYSILOXANE RESINOUS COMPOSITIONS CONTAINING BIS(SILYL) AROMATIC OR AROMATIC ETHER LINKAGES
William Randall Bamford, West Kilbride, and James Caithness Cuthill, Ardrossan, Scotland, assignors to Imperial Chemical Industries Limited, London, England, a corporation of Great Britain
No Drawing. Filed Aug. 1, 1966, Ser. No. 569,100
Claims priority, application Great Britain, Aug. 6, 1965, 33,735/65
Int. Cl. C08g 31/32
U.S. Cl. 260—18    19 Claims

ABSTRACT OF THE DISCLOSURE

There is provided a new resinous composition which may be cured into an infusible state, which compositions have the structure of the reaction product of a compound of the general formula

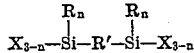

wherein R is a monovalent hydrocarbon group, R' is a phenylene, diphenylene or diphenylene oxide, X is a hydroxy or alkoxy group and $n$ is 1 or 2 and a silane of the general formula $R_m''SiY_{4-m}$ wherein R'' is a monovalent hydrocarbyl or substituted hydrocarbyl groups, Y is an alkoxy, aryloxy or hydroxy group except when the X groups are alkoxy groups in which case Y must be hydroxy or acyloxy groups and $m$ is 0, 1 or 2.

---

This invention relates to new and useful resinous compositions and more particularly to such compositions based on organosilicon compounds.

A wide variety of resinous compositions are known and have been prepared from organosilicon compounds. These find many uses, the most important in each case being determined by the nature of the organic portions of the composition and by its structure. Among such compositions are those which comprise the reaction product of a compound of the general formula

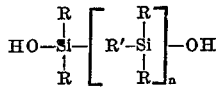

where R is a monovalent hydrocarbon group, R' is a divalent aromatic group and $n$ is 0 or 1, with a compound of the general formula $R_b''Si(OR''')_{4-b}$, where R'' is hydrogen or a monovalent hydrocarbon group, R''' is a monovalent hydrocarbon group and $b$ is 0 or 1, or with a partial hydrolysate or polymerisate of such a compound. The present invention resides in an improvement in or modification of the said compositions.

According to the present invention new and useful resinous compositions comprise the reaction product of a compound of the general formula

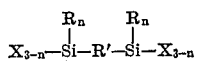

wherein R is a monovalent hydrocarbyl or substituted hydrocarbyl group, R' is a phenylene, diphenylene or diphenyleneoxide group, X is a hydroxy or alkoxy group and $n$ is 1 or 2 and a silane of the general formula $R_m''SiY_{4-m}$ wherein R'' is a monovalent hydrocarbyl or substituted hydrocarbyl group, Y is an alkoxy, acyloxy or hydroxy group except when the X groups are alkoxy groups in which case Y must be hydroxy or acyloxy groups, and $m$ is 0, 1 or 2.

The groups R may be selected from a wide variety of monovalent hydrocarbyl or substituted hydrocarbyl groups and may be unsubstituted or substituted alkyl, aryl, alkaryl, aralkyl, cycloalkyl, alkenyl or cycloalkenyl groups. Suitable groups include, for example, methyl, ethyl, propyl, 3,3,3-trifluoropropyl, vinyl, cyclohexyl, phenyl, tetrachlorophenyl, tolyl, benzyl and cyclopentenyl groups. For many purposes it is preferred that the groups R be phenyl groups.

While the group R' may be a phenylene, diphenylene or diphenyleneoxide group, it is for many purposes, preferred that it be a phenylene group.

The groups X may be selected from hydroxyl groups or any alkoxy groups, for example, methoxy, ethoxy, propoxy, isopropoxy and butoxy groups. In general it is preferred that they be ethoxy groups.

The groups R'', like the groups R, may be selected from a wide variety of monovalent hydrocarbyl or substituted hydrocarbyl groups and may be unsubstituted or substituted alkyl, alkaryl, aralkyl, cycloalkyl, alkenyl or cycloalkenyl groups. Suitable groups include, for example, methyl, ethyl, propyl, 3,3,3-trifluoropropyl, phenyl, tetrachlorophenyl, tolyl, benzyl, cyclohexyl, vinyl and cycdlopentenyl groups. The groups R'' may be, and in some cases preferably are, the same as the groups R.

The groups Y may be hydroxy, acyloxy or alkoxy groups, it being necessary only that when the groups X are alkoxy groups the groups Y must be hydroxy or acyloxy groups. Suitable alkoxy groups which may be used include, for example, methoxy, ethoxy, propoxy, isopropoxy and isobutoxy groups. A variety of acyloxy groups may be used and acetoxy groups are particularly useful.

The two compounds may be reacted together in widely varying proportions, for example, from 1 to 8 or more moles of the silane for every 8 moles of the other reactant. It is, however, in many cases preferred to use from 3 to 6 moles of the silane for every 8 moles of the other reactant. Adequate reaction can, of course, take place if the two reactants are present in amounts to give molecular equivalence of reaction groups.

If desired the reaction may be carried out in presence of a catalyst and in many cases it is preferred to use a catalyst. In cases other than where X is a hydroxy group and Y is an acyloxy group it is in fact necessary to use a catalyst. The catalyst may be of the type known to be suitable for use in the reaction between compounds containing ≡SiOH groups and compounds containing ≡SiOR groups. Suitable catalysts which may be used include, for example, carboxylic acid salts of tin such as stannous octoate, dibutyltin-dilaurate, dibutyltin-2-ethylhexoate and dioctyltin oxide and other metal salts such as zinc octoate. In many cases stannous octoate is preferred. If a catalyst is used the amount may vary widely, for example, up to 5 percent or more by weight of the reactants. The generally preferred amount is, however, from 0.5 to 1.5 percent.

The reaction may be carried out over a wide range of temperatures, for example, from 80 to 200° C. or higher. The actual temperature used in any specific case, however, may well be governed by the specific reactants and solvent, if any, used since in general it is preferable to operate at the highest practicable temperature and this may well be the refluxing temperature of the mixture.

The time required for reaction will, of course, vary with the particular reactants used, the proportions thereof, the solvent used if any and the temperature of reaction. Normally reaction is complete in from 1 to 3 hours but further heating, for example, up to 6 hours does not affect the stability of the product except in the absence of any solvent. The extent of the reaction may be determined by withdrawing a sample, removing any solvent therefrom and heating to the insoluble, infusible stage.

Reaction is normally considered adequate when the cure time at 250° C. is not greater than about 30 minutes.

The reaction may, if desired, be carried out in presence of an inert solvent and in fact it is normally preferred to use a solvent. Suitable solvents which may be used include, for example, hydrocarbons and substituted hydrocarbons, such as toluene, xylene, o-dichlorobenzene and the like. The amount, if any, of solvent used may vary widely, for example, from 70 to 200 or more percent by weight of the reactants. Any solvent used may be partially or completely removed after reaction is complete to give either a stable resin or a stable resin solution.

The resins and resin solutions of our invention can be used for a wide variety of purposes, for example, casting of films, preparation of laminates such as glass fibre or asbestos fibre laminates, preparation of filled moulding powders, such as glass fibre or asbestos filled moulding powders and the like, and can be cured to infusible, insoluble products by heating at temperatures of, for example, 150 to 250° C.

Our invention is further illustrated by the following examples in which all parts and percentages are by weight.

Example 1

280 parts of 4,4' - bis(diphenylhydroxysilyl)diphenyl ether were heated under reflux with 350 parts of toluene and 50 parts of tetraacetoxysilane for 4 hours. The mixture was cooled to 20° C. and filtered whereby a clear resin solution was obtained. A film cast from this solution cured to the insoluble, infusible state on heating at 180° C. for 1 hour.

Example 2

340 parts of 4,4'-bis(diphenylhydroxysilyl)diphenyl ether were heated under reflux for 5 hours with 350 parts of toluene and 113 parts of phenyltriacetoxysilane and the mixture thereafter cooled to 20° C. and filtered whereby there was obtained a clear resin solution. A film cast from this solution was heated for 10 minutes at 200° C. and gave an insoluble, infusible film. This film when heated from 100 hours at 400° C. lost only 20 percent of its weight.

Example 3

300 parts of 4,4'-bis(diphenylhydroxysilyl)diphenylether were heated under reflux with 350 parts of toluene and 100 parts of phenyltriacetoxysilane for several minutes. 2.5 parts of stannous octoate were then added and the mixture heated under reflux for 1 hour. The mixture was thereafter cooled to 20° C. and filtered, whereby a clear resin solution was obtained. A film cast from this solution was cured to the infusible, insoluble state by heating for 10 minutes at 200° C.

Example 4

210 parts of 4,4' - bis(diphenylethoxysilyl)diphenylether and 45 parts of tetra-acetoxysilane were dissolved in 200 parts of o-dichlorobenzene by heating to reflux temperature. 5 parts of stannous octoate were then added and the mixture heated under reflux for 10 hours. The mixture was thereafter cooled to 20° C. and filtered, whereby there was obtained a clear resin solution. A film cast from this solution was curred to the infusible, insoluble state by heating for 30 minutes at 250° C.

Example 5

177 parts of 1,4-bis(phenyldihydroxysilyl)benzene and 244 parts of diphenyldimethoxysilane were dissolved in 300 parts of toluene at reflux temperature. 2.5 parts of stannous octoate were then added and the mixture heated under reflux for 2½ hours. The mixture was then cooled to 20° C. and filtered whereby a clear resin solution was obtained. A film cast from this solution was cured to the infusible, insoluble state by heating for 30 minutes at 200° C.

Example 6

180 parts of 1,4-bis(phenyldihydroxysilyl)benzene and 300 parts of diphenyldiacetoxysilane were dissolved in 300 parts of toluene and the solution heated under reflux for 3½ hours. The mixture was thereafter cooled at 20° C. and filtered, whereby there was obtained a clear resin solution. A film cast from this solution was cured to the infusible, insoluble state by heating for 30 minutes at 200° C.

Example 7

116 parts of 1,4-bis(phenyldiethoxysilyl)benzene and 108 parts of diphenylsilanediol were dissolved in 200 parts of o-dichlorobenzene by heating the mixture to reflux temperature. 2.5 parts of stannous octoate were then added and the mixture heated under reflux for 3 hours. The mixture was thereafter cooled to 20° C. and filtered whereby there was obtained a clear resin solution. A film cast from this solution was cured to the infusible, insoluble state by heating for 10 minutes at 180° C.

Example 8

116 parts of 1,4-bis(phenyldiethoxysilyl)benzene and 150 parts of diphenyldiacetoxysilane were dissolved in 200 parts of o-dichlorobenzene. 2.5 parts of stannous octoate were then added and the mixture heated under reflux for 3 hours. The mixture was thereafter cooled to 20° C. and filtered whereby there was obtained a clear resin solution. A film cast from this solution was cured to the infusible, insoluble state by heating for 20 minutes at 180° C.

Example 9

200 parts of 4,4' - bis(diphenylhydroxysilyl)diphenyl were heated under reflux with 230 parts of o-dichlorobenzene and 40 parts of tetraethoxy silane until all solid solution was complete. 2 parts of stannous octoate were then added and the mixture heated under reflux for 3 hours. The mixture was cooled to 20° C. filtered to give a clear resin solution. A film cast from this solution was cured to the infusible and insoluble state by heating at 180° C. for 10 minutes. This film lost 3 percent of its weight after heating for 100 hours at 400° C.

Example 10

310 parts of p-bis(acetoxydimethylsilyl)benzene was dissolved in 200 parts of o-dichlorobenzene and 110 parts of tetraethoxysilane added. The mixture was heated to 100° C. and 3 parts of stannous octoate added. The mixture was then heated under reflux for 2 hours cooled and filtered. A clear resin solution was obtained. Cure time of a film cast from this solution was 10 minutes at 200° C.

What we claim is:

1. A resinous composition which may be cured into an infusible state which composition has the structure of the reaction product of a compound of the general formula

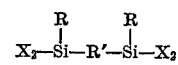

where R is a monovalent hydrocarbon group, R' is a phenylene, diphenylene or diphenylene oxide, X is a hydroxy or alkoxy group and a silane of the general formula $R_m''SiY_{4-m}$ wherein R'' is a monovalent hydrocarbyl or chlorine substituted hydrocarbyl groups, Y is an alkoxy, aryloxy or hydroxy group except when the X groups are alkoxy groups in which case Y must be hydroxy or acyloxy groups and m is 0, 1 or 2, where the reaction is carried out at a temperature of at least 80° C. up to the reflux temperature.

2. A composition according to claim 1 wherein the groups R are unsubstituted or substituted alkyl, aryl, alkaryl, aralkyl cycloalkyl, alkenyl and cycloalkenyl groups.

3. A composition according to claim 2 wherein R is methyl, ethyl, propyl 3,3,3-trifluoropropyl, vinyl, cyclohexyl, tetrachlorophenyl, tolyl, benzyl and cyclopentenyl groups.

4. A composition according to claim 2 wherein R is a phenyl group.

5. A composition according to claim 1 wherein R' is a phenylene group.

6. A composition according to claim 1 wherein the groups R" are unsubstituted or substituted alkyl, aryl, alkaryl, aralkyl, cycloalkyl, alkenyl, or cycloalkenyl groups.

7. A composition according to claim 6 wherein the groups R" are methyl ethyl, propyl, 3,3,3-trifluoropropyl, tetrachlorophenyl, tolyl, benzyl, cyclohexyl, vinyl or cyclopentenyl groups.

8. A composition according to claim 1 wherein the groups R" are phenyl groups.

9. A composition according to claim 1 wherein the groups R" and the groups R are the same.

10. Articles produced by curing a composition claimed in claim 1.

11. A process for the production of a resinous composition which may be cured into an infusible state comprising reacting at a temperature between 80 and 200° C. a first compound of the general formula

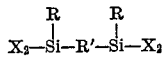

wherein R is a monovalent hydrocarbon group, R' is a phenylene, diphenylene or diphenylene oxide, X is a hydroxy or alkoxy group and a silane of the general formula $R_m''SiY_{4-m}$ wherein R" is a monovalent hydrocarbyl or chlorine substituted hydrocarbyl groups, Y is an alkoxy, aryloxy or hydroxy group except when the X groups are alkoxy groups in which case Y must be hydroxy or acyloxy groups and m is 0, 1 or 2.

12. A process according to claim 11 wherein from 3 to 6 moles of the silane are reacted with 8 moles of the said first compound.

13. A process according to claim 11 wherein the two reactants are present in amount to give molecular equivalence of reactive groups.

14. A process according to claim 11 wherein a tin salt of a carboxylic acid is used as a catalyst.

15. A process according to claim 14 when the tin salt is selected from dibutyltindilaurate, dibutyltin-2-ethylhexoate and dioctyltin oxide.

16. A process according to claim 14 wherein the catalyst is stannous octoate.

17. A process according to claim 11 wherein zinc octoate is used as a catalyst.

18. A process according to claim 14 wherein the catalyst is used in amount up to 5 percent by weight of the reactants.

19. A process according to claim 18 wherein the catalyst is used in amount from 0.5 to 1.5 percent by weight of the reactants.

References Cited

UNITED STATES PATENTS

| | | | |
|---|---|---|---|
| 3,200,137 | 8/1965 | Omietanski et al. | 260—448.2 |
| 3,287,310 | 11/1966 | Omietanski | 260—37 |
| 3,305,525 | 2/1967 | Goossens | 260—46.5 |
| 3,325,530 | 6/1967 | Wu | 260—46.5 |
| 3,135,777 | 6/1964 | Nielsen | 260—448.2 |

DONALD E. CZAJA, Primary Examiner

M. I. MARQUIS, Assistant Examiner

U.S. Cl. X.R.

260—46.5, 448.2; 161—93; 117—161